Jan. 8, 1929. A. REDLER 1,697,963
CONVEYER
Filed Feb. 9, 1925  9 Sheets-Sheet 1
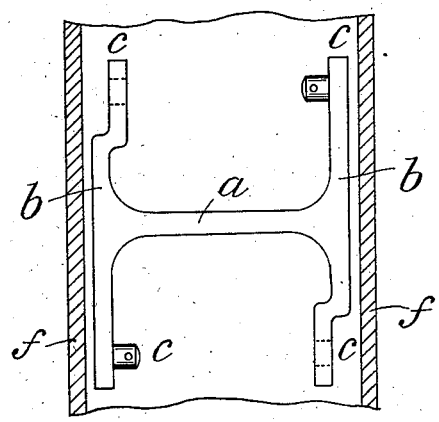
Fig. 1.
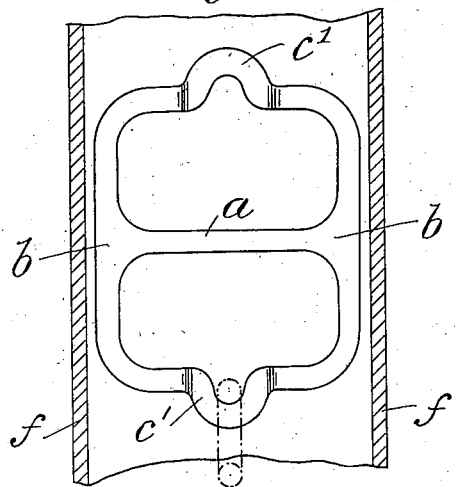
Fig. 3.
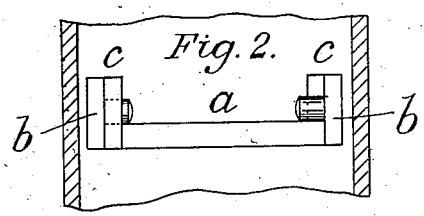
Fig. 2.
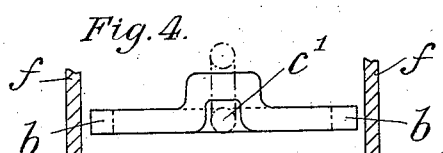
Fig. 4.
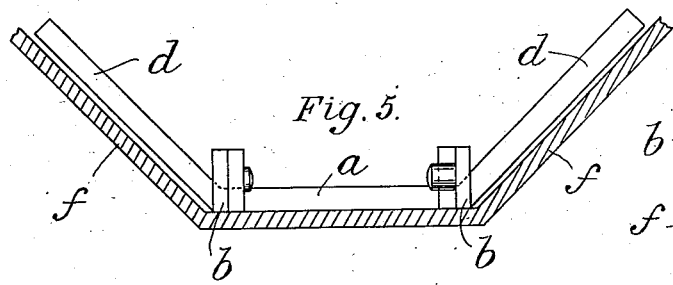
Fig. 5.
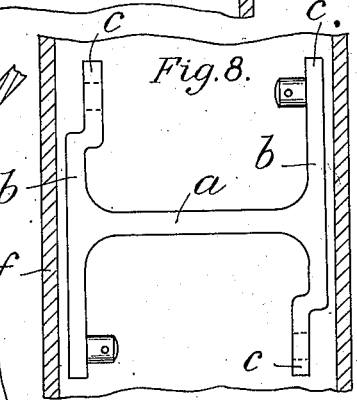
Fig. 8.
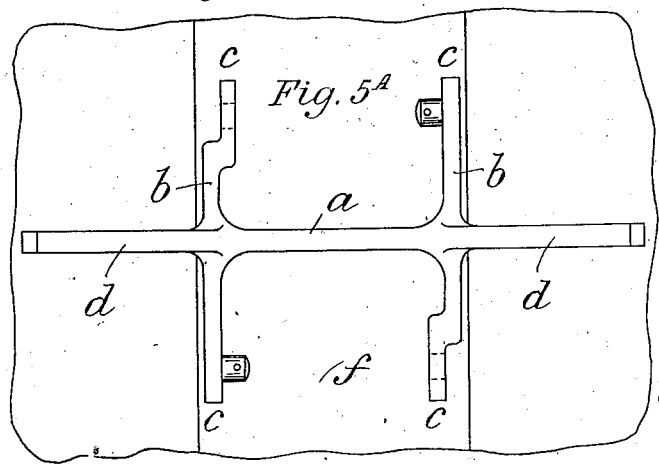
Fig. 5ᴬ.
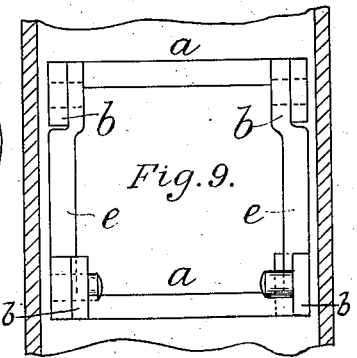
Fig. 9.
INVENTOR:
ARNOLD REDLER,
By Toulmin & Toulmin Jan. 8, 1929. 1,697,963
A. REDLER
CONVEYER
Filed Feb. 9, 1925  9 Sheets-Sheet 2

INVENTOR:
ARNOLD REDLER,
By Paulmin & Paulmin,

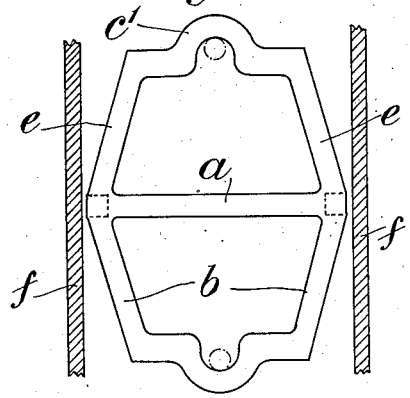
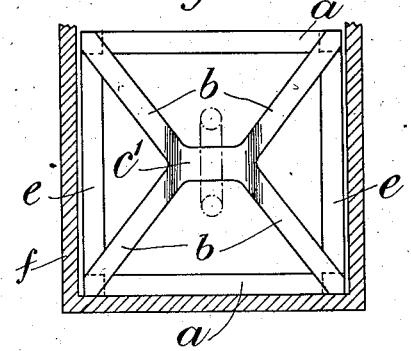
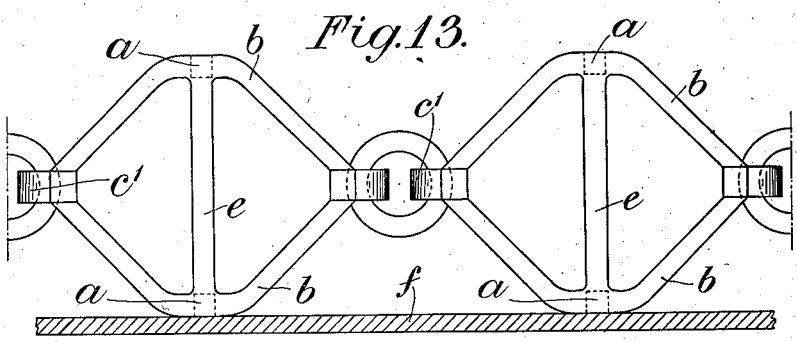
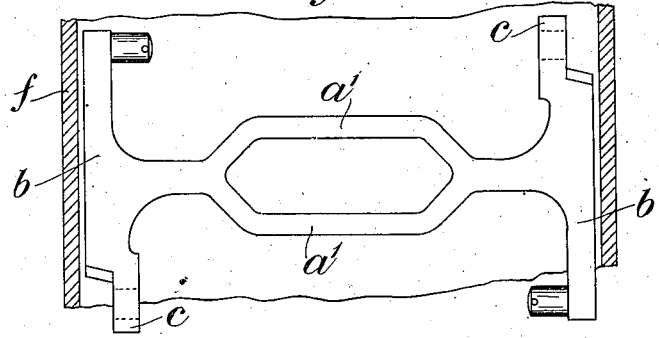
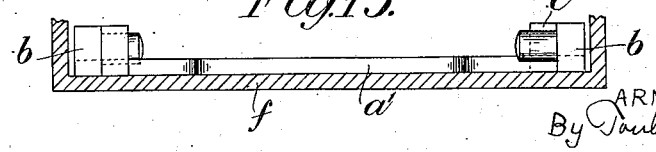

Jan. 8, 1929.

A. REDLER

CONVEYER

Filed Feb. 9, 1925  9 Sheets-Sheet 4

INVENTOR:
ARNOLD REDLER,
By Toulmin Toulmin.

Jan. 8, 1929.  
A. REDLER  
1,697,963  
CONVEYER  
Filed Feb. 9, 1925  9 Sheets-Sheet 5

INVENTOR:  
ARNOLD REDLER,  
By Toulmin & Toulmin

Jan. 8, 1929. 1,697,963
A. REDLER
CONVEYER
Filed Feb. 9, 1925 9 Sheets-Sheet 6

INVENTOR:
ARNOLD REDLER,
By Toulmin&Toulmin

Jan. 8, 1929.  A. REDLER  1,697,963
CONVEYER
Filed Feb. 9, 1925   9 Sheets-Sheet 7

INVENTOR:
ARNOLD REDLER,
By Toulmin & Toulmin

Jan. 8, 1929.  A. REDLER  1,697,963
CONVEYER
Filed Feb. 9, 1925   9 Sheets-Sheet 8

INVENTOR:
ARNOLD REDLER,

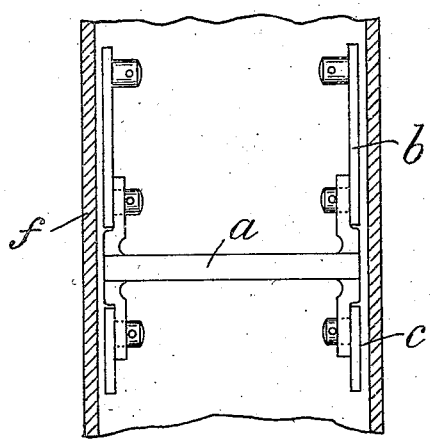
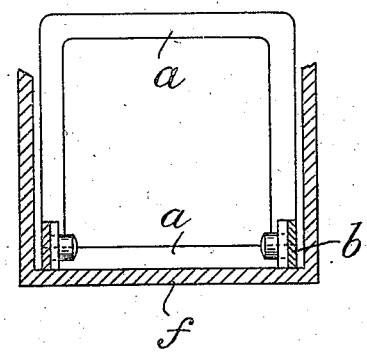
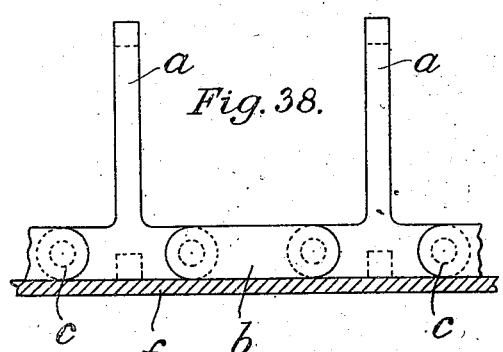
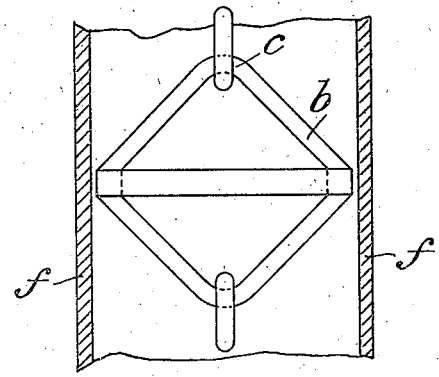
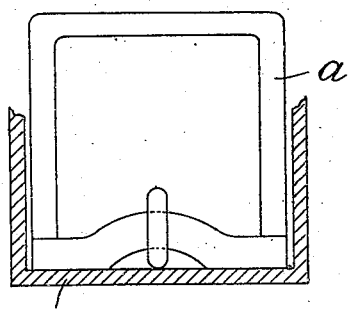
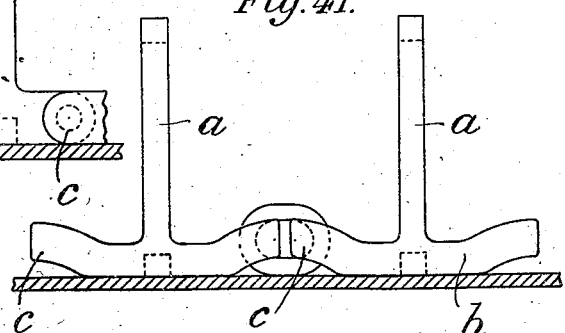

Patented Jan. 8, 1929.

1,697,963

UNITED STATES PATENT OFFICE.

ARNOLD REDLER, OF SHARPNESS DOCKS, ENGLAND.

CONVEYER.

REISSUED

Application filed February 9, 1925, Serial No. 7,914, and in Great Britain June 5, 1924.

This invention relates to conveyers of the type comprising a chain moving in a closed or open trough, as described in my patent specification No. 1,475,596. In this specification I have described a conveyer in which the load is carried on a layer of the material held in the links of an open chain, said layer acting exactly as a band conveyer.

According to this invention I provide a conveyer or conveyer chain or chains, characterized in that the chain or chains are constructed of open linkwork with crossbars of small dimensions in the direction of travel.

The conveyer chain may be made or built up of one or more chains with or without connecting bars between the chains where more than one chain is employed and with or without projections on the outer sides of the chain or chains.

In one arrangement the chain or chains can be placed side by side in an open trough and they can be driven individually or connected together with connecting bars so as to form a multiple chain. A chain so constructed is capable of carrying a load whose depth is approximately equal to the width of the chain. In certain cases where it is desirable to keep the width of the conveyer narrow, one or more chains can be placed above the first chain or chains at a distance approximately equal to the width of the said first chain or chains; this method of layers can be repeated if additional conveying capacity is required. These one or more upper chains can, if desired, be driven individually and independently of the first chain or chains, or if preferred the upper chain or chains can be connected with connecting bars to the first or under chain.

To enable the last described combined chain to negotiate sprockets or curves, the top chain can be loosely hinged in order to allow it to lengthen or shorten as the case may be.

The trough or box for conveyers made in accordance with this invention can be open or closed, or partly open and partly closed, or either of the foregoing, a portion of the chain or chains running in the open.

In one arrangement, the top run conveys the material in the direction from the trailing terminal to the driving terminal, and the material can be discharged anywhere between these two points or be discharged over the driving terminal. An alternative method is for the under chain to do the conveying and the return chain to be carried above the trough or box which contains the under run, or the upper run can be carried in a trough entirely separate from the under run.

In another arrangement the circuit of the chain is in a closed trough (or partly closed and partly open trough) with only one driving terminal. For this purpose a suitable chain is one constructed as above stated with one chain connected with bars to a chain at a distance above it equal to the width of the chain together forming a built-up chain, the upper chain or member or members of the chain being provided with loose joints as above described. In operation, the bottom portion of the built-up chain does the conveying on the upper run of the circuit, and the other portion of the built-up chain does the conveying in the lower run of the circuit.

In completing the circuit around the vertical portion, both portions of the built-up chain come into operation, the effect being that the material can be conveyed around the whole circuit in whichever direction desired, provided the sprockets are situated so as not to interfere with the travel of the material. In practice one or more inlets can be introduced anywhere in the circuit, provided the angle of the incline of the conveyer in that particular position or positions is such that material would flow into the conveyer as the material is being led away. One or more outlets can be arranged in the circuit of the conveyer.

In certain cases, to facilitate the receiving in or discharge of the material, or for other reasons, the chain can be in the open anywhere in the circuit.

In plain open linkwork, the crossbars in depth can be about $\frac{1}{8}$ to $\frac{1}{7}$ the pitch or distance of one crossbar from the other, and I have found that the crossbars 4 inches apart and $\frac{3}{8}$ inches deep give good results for all conveyers up to 8 inches wide.

In plan, the configuration of the crossbars and sides can be of various forms, but the averaging of the configuration to simple straight crossbars should bear the crossbar depth ratio to the distance they are apart as stated above.

In plan, the chains can be of any configuration. The open spaces in the chain or chains or open linkwork should preferably be large enough to allow the substances to be conveyed to fall through in order to discharge when passing over apertures which can be provided in the bottom of the trough. In some cases when the discharge is over a sprocket or other terminal, material can be larger than the holes or spaces formed in the chain or chains.

In one form of chain, the sides of the links can be brought together to a point forwardly or rearwardly in order to lessen the number of the joints or hinges in the chain and also to enable the chain to hinge in a lateral direction as well as being hinged in the other direction, portions of the sides performing the function of crossbars. In like manner where chains are built-up by means of connecting bars at a parallel distance one above the other, instead of four hinged joints connecting one built-up link to the next, the four sides can be brought together to central points one forwardly and one rearwardly to form universal joints between the links in the centre line of the built-up chain.

The upper and lower runs of the chains do not run in the same box or trough. The top and bottom runs act independently. One can be in an open or closed trough and the other in the open at any distance therefrom, or each may be in entirely separate open or closed troughs, or the circuit of the chain can be completed in either of the above ways provided the two runs of the chain are not contained in the same trough anywhere.

If to economize space, or for other reasons, it is found necessary that the troughs of both runs be in close proximity to each other, it is essential in order to comply with this invention that one run be in a space entirely separated from the other run, so that both runs can act independently.

The boxes or troughs can be made of wood, iron, concrete or other suitable material, and can be loosely jointed, if desired, or constructed of flexible material so as to be easily moved into other positions or bent into various forms.

The depth of the trough can be equal to the overall width of the chain or chains, and the chains so constructed are capable of carrying a load whose depth is approximately equal to the depth in the inside trough or box with the crossbar or crossbars of the chain or chains in all cases being less than ⅙ of the inside trough.

The cross section of trough, box, or casing can be square, rectangular, round, or any form desired. Play should be allowed between the chain and the casing, the amount depending on the nature of the material.

In some cases the sides of the trough may be inclined to the bottom, and the sides of the link provided with projections at a similar inclination, the projections perform the same function as the crossbars and the restricting depth of the projections should be measured at right angles to the surface against which the projections bear. In like manner, links may be constructed with projections in any inclined horizontal or vertical positions in comb-like or other formation.

Instead of lengthening or shortening the chain to fit the box, trough or casing, the trough or casing can be adjustable by means of a telescopic or other suitable arrangement.

One or more driving sprockets or other like means or guides or trailing sprockets can be provided for each conveyer. If desired, any of them can be made adjustable to tighten or slacken the chain or chains.

One or more chains may be placed in the same trough side by side and one or more chains may be placed above them forming a layer or layers, or the trough or box can be parted longitudinally a part or the whole of its length or circuit, so that the same or different materials can be conveyed without one portion coming into contact with another portion. Likewise one or more built-up chains can be placed side by side or one or more above each other, and if desired they can be separated in the same trough or box as described.

One or more conveyers of any modified form in accordance with this invention can work in conjunction with each other or with apparatus described in my patents for a chain-like discharger (No. 1,416,416), for a conveyer (No. 1,475,596) and for links (No. 1,433,567), or with apparatus relating to conveying and elevating from a ship's hold described in my pending patent application Serial No. 680,613, or with apparatus for conveying or feeding material to weighing machines, or to any other machinery for any purposes whatever.

So-called drag chains, hitherto used for the purpose of conveying loose material, have crossbars on edge. In the conveyer according to this invention, I lay them on flat, with sufficient flat for strength.

I find that for 8 inch chains, the crossbars should be ⅜ inch by ¾ inch in width, to give the necessary strength in the metal. The distance between the crossbars should be about 4 inches. For larger sized chains, the size of the metal should be increased proportionately to provide sufficient strength for the increased loads so that for a 16 inch chain, the crossbar should ¾ inch deep by 1½ inches wide in which case the apertures can be a little larger, (than for 8 inch chain) say 6 inches. I, however, prefer the crossbar less deep if the strength of the metal will allow it and a smaller aperture. If desired, the crossbar can be open in the middle to impart greater strength to the construction and enabling the metal to be slightly less in depth.

The joints of the chain should be of much greater depth than the depth of its crossbar. The crossbars can be in a plane in the centre line of the joints, or they may be in the plane of the top of the joints, or in a plane with the bottom of the joints, or they may be partly in one plane and partly in another plane in the same conveyer.

One form of link can be constructed in a cellular form so that one member of the crossbar at its highest point is above the centre line of the chain a distance equal to one-half the width of the link. The other member of the crossbar at its lowest point may be a similar distance below the centre line of the chain, so that the crossbar can be in the form of a square or circle, or they can be made in any form desired. The sides of the link can be brought together to a point to connect with the adjoining link with a universal joint in the centre line of the chain.

In an alternative arrangement, the crossbar can be cellular or bridged and brought to height approximately equal to the width of the chain. Also, if desired, the sides of the links can be brought together to points forwardly and rearwardly, each point to connect with the adjoining link with a single universal joint.

If desired, each alternate link can be connected so that the sides are vertical one over the other, whilst the intermediate links have the sides horizontal, or the sides can be arranged in continuous alignment with one another or otherwise.

With links made in accordance with this invention, the chains may take a tortuous course in one or more planes.

By the term conveyer, I include all chain conveyers, whether working horizontally, vertically or on any slope, such chain conveyers transporting the material en masse, that is, as a whole.

It will also be understood that the casing when used as an elevator is closed.

Referring to the diagrammatic drawings filed herewith:

Fig. 1 is a plan of one form of link made in accordance with this invention;

Fig. 2 is an end elevation of the link shown in Fig. 1;

Fig. 3 is a plan of a link showing the sides brought to a point forwardly and rearwardly;

Fig. 4 is an end elevation of the link shown in Fig. 3;

Fig. 5 is an end view of a link in which the projections on the sides are inclined to the base;

Figure 6:
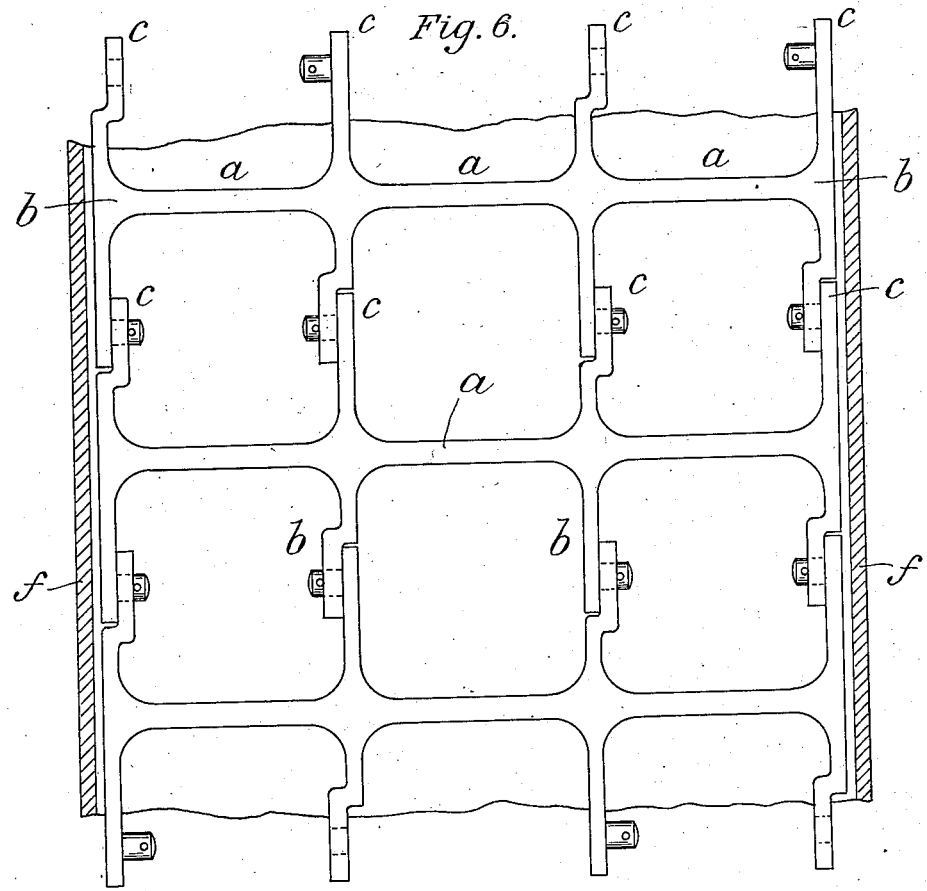
Figure 7:
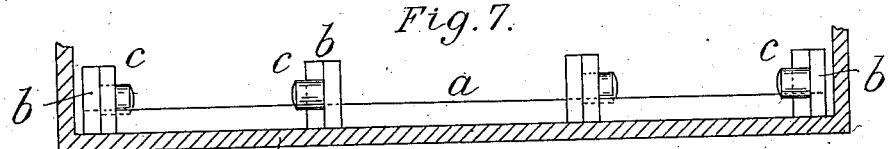
Figure 10:
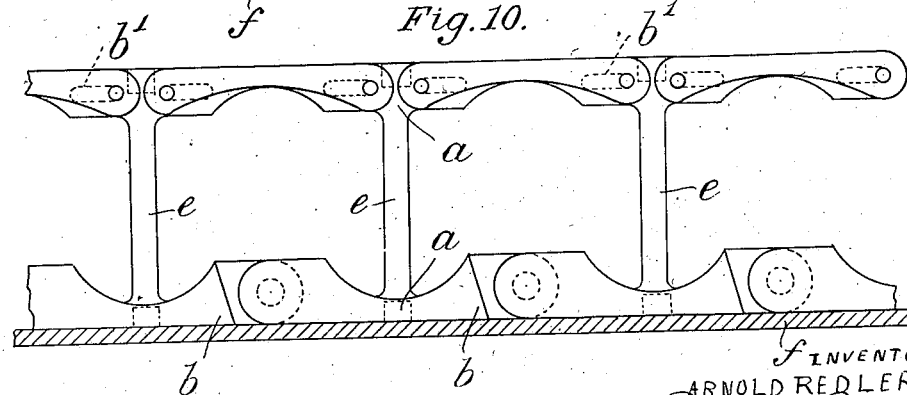
Figure 16:
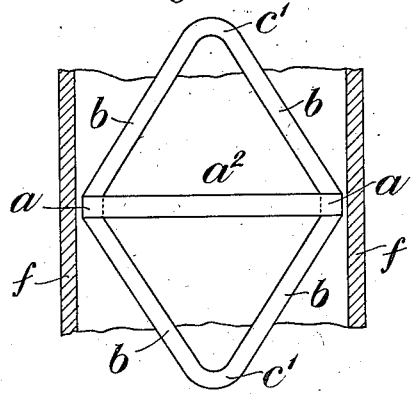
Figure 17:
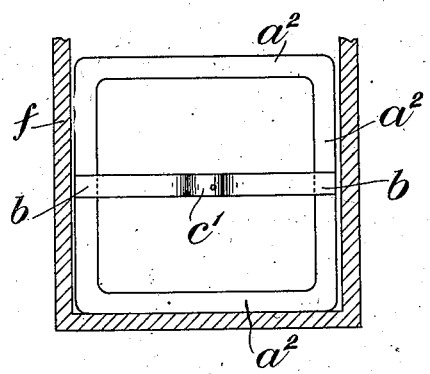
Figure 18:
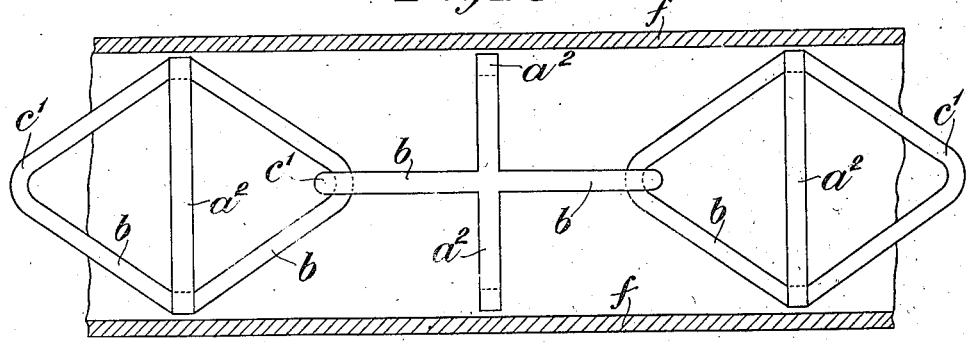
Figure 19:
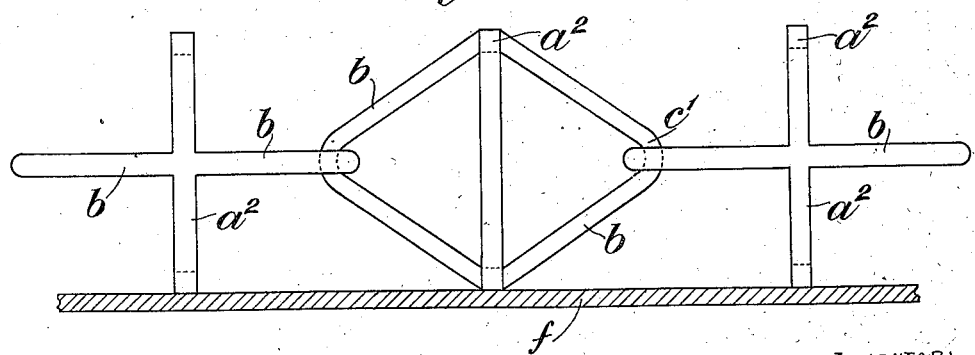
Figure 20:
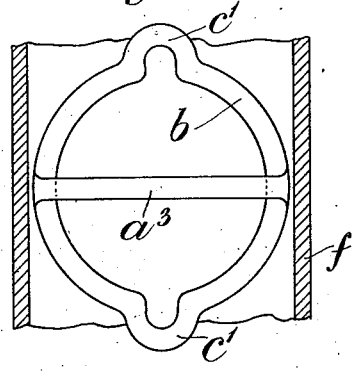
Figure 21:
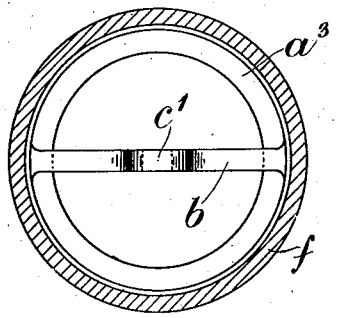
Figure 22:
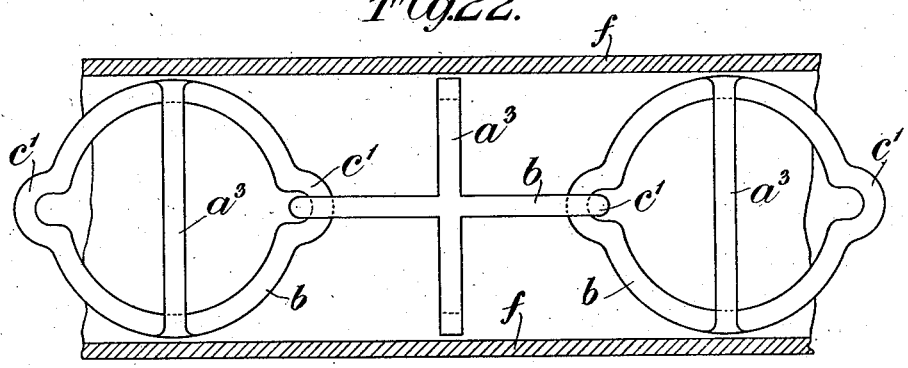
Figure 23:
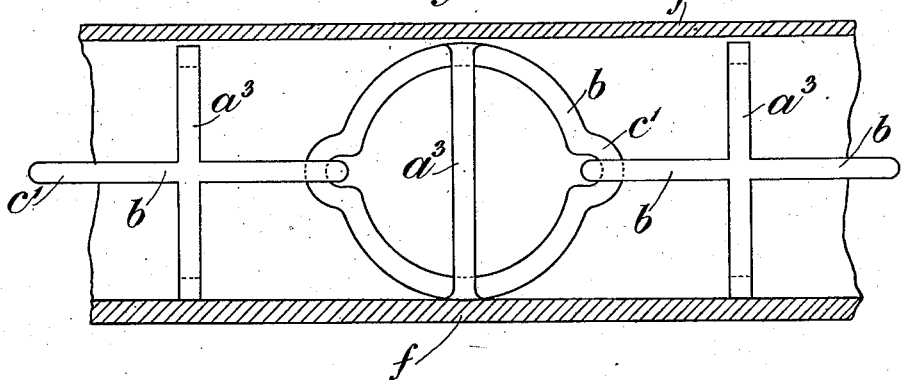
Figure 24:
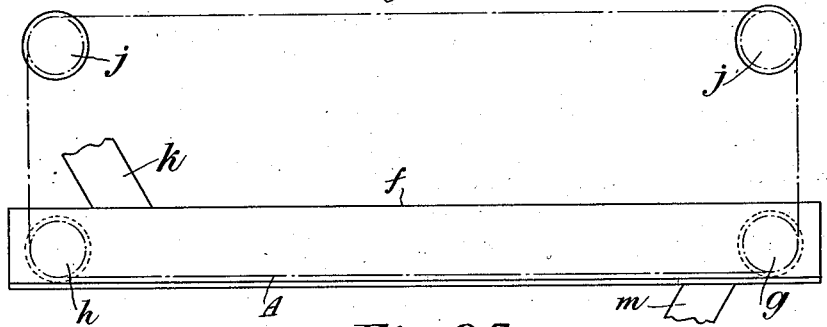
Figure 25:
Figure 26:
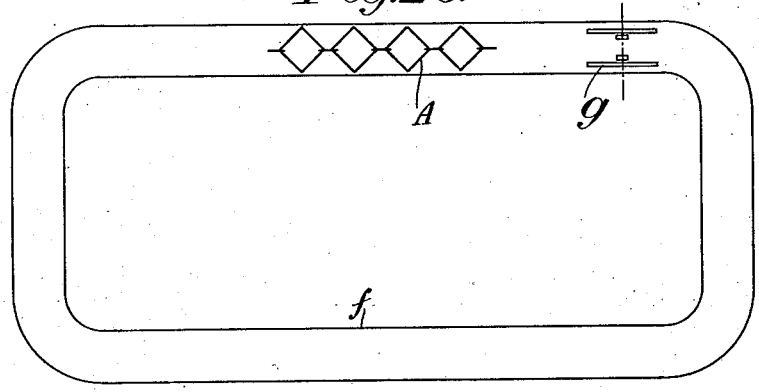
Figure 27:
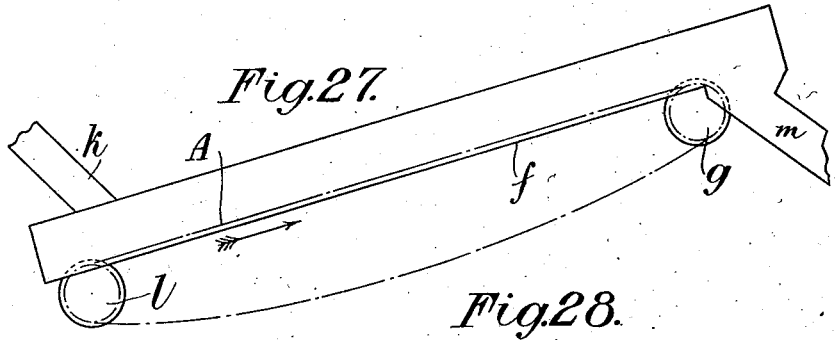
Figure 28:
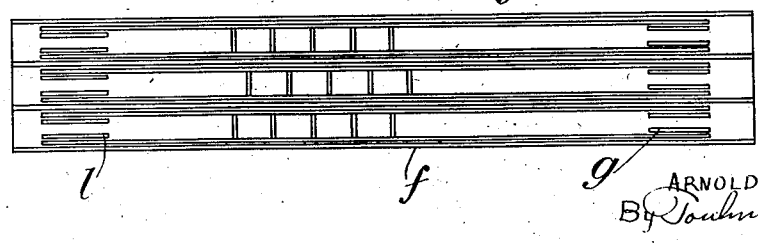
Figure 29:
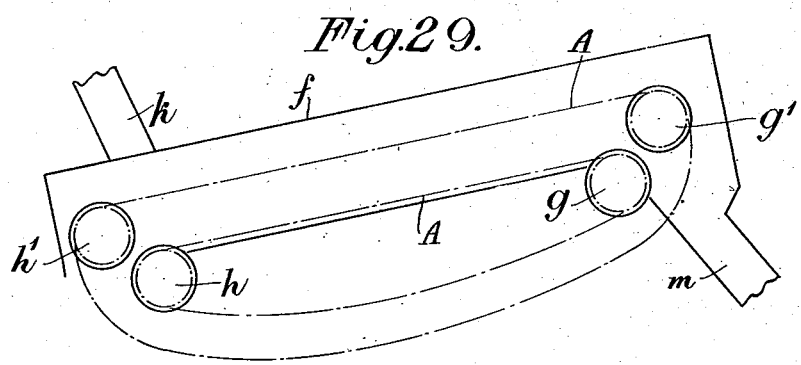
Figure 30:
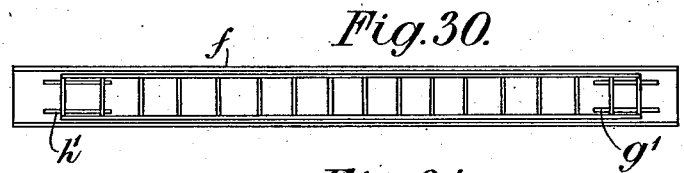
Figure 31:
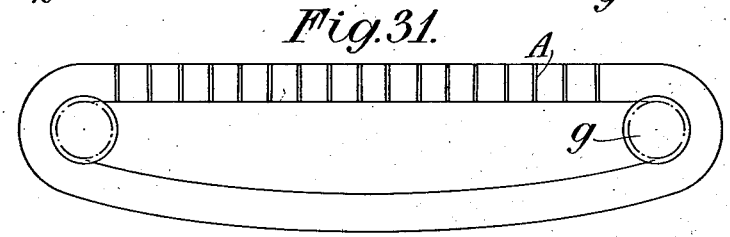
Figure 32:
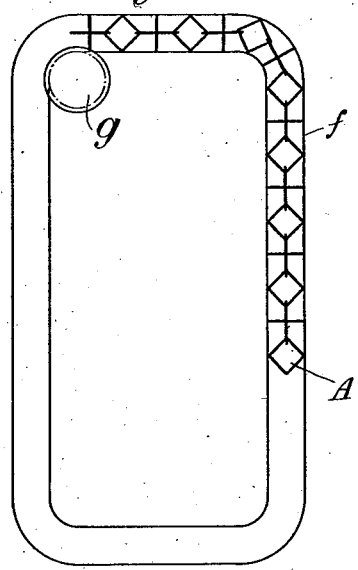
Figure 33:
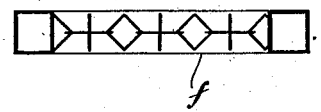
Figure 34:
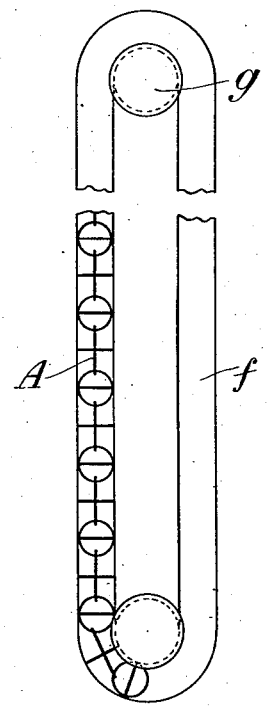
Figure 35:
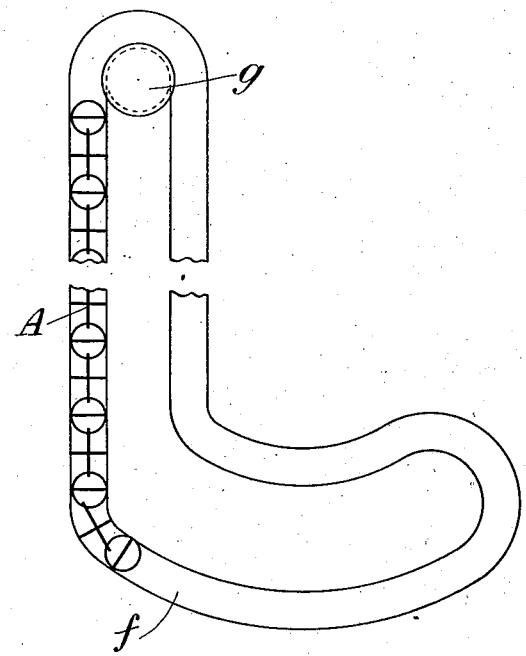

Fig. 5ª is a plan of Fig. 5;

Fig. 6 is a plan of a multiple chain formed with links similar to that shown in Fig. 1;

Fig. 7 is an end elevation of the chain shown in Fig. 6;

Fig. 8 is a plan of one form of built-up link;

Fig. 9 is an end elevation of the built-up link shown in Fig. 8;

Fig. 10 is a side elevation of a chain formed of links shown in Figs. 8 and 9;

Fig. 11 is a plan of another form of built-up link with the hinges in the centre line;

Fig. 12 is an end elevation of the link shown in Fig. 11;

Fig. 13 is a side elevation of a chain formed of links shown in Figs. 11 and 12;

Fig. 14 is a plan of a link provided with an open crossbar;

Fig. 15 is an end elevation of the link shown in Fig. 14;

Fig. 16 is a plan of a link in which the crossbar is open above and below the centre line;

Fig. 17 is an end elevation of the link shown in Fig. 16;

Fig. 18 is a plan of a chain formed of links shown in Figs. 16 and 17;

Fig. 19 is a side elevation of the chain shown in Fig. 18;

Fig. 20 is a plan of a modified construction of link of Fig. 16 in circular form;

Fig. 21 is an end elevation of the link shown in Fig. 19;

Fig. 22 is a plan of a chain formed of links shown in Figs. 20 and 21;

Fig. 23 is a side elevation of the chain shown in plan in Fig. 22;

Fig. 24 is an elevation of a conveyer with the upper run of the chain in the open, the under run carrying the material in an open or closed trough, the chain being a single or multiple formation of links shown in Figs. 1 and 2 or 6 and 7;

Fig. 25 is a plan of the conveyer shown in Fig. 24 with a single chain;

Fig. 26 is a plan of a circuit conveyer working in a horizontal plane and formed of links shown in Figs. 3 and 4;

Fig. 27 is an elevation of a conveyer with the under run of the chain in the open, the upper run carrying the material in an open or closed trough, the chain being of single or multiple formation of links shown in Figs. 1 and 2 or 6 and 7;

Fig. 28 is a plan of the conveyer shown in Fig. 27;

Fig. 29 is an elevation of a conveyer as shown in Fig. 27 in which two chains, one above the other are employed;

Fig. 30 is a plan of the conveyer shown in Fig. 29;

Fig. 31 is an elevation or plan of a circuit conveyer disposed in any plane and with links as shown in Figs. 8, 9 and 10, *g* is the driving terminal;

Fig. 32 is a plan or elevation of a circuit conveyer with links as shown in Figs. 16, 17, 18 and 19;

Fig. 33 is a view at right angles to the view shown in Fig. 32;

Fig. 34 is a plan or elevation of a circuit conveyer having a pipe-like casing with links as shown in Figs. 20, 21 and 22 and 23 adapted to be bent to travel at any inclination to the vertical and horizontal planes;

Fig. 35 is a plan or elevation of a circuit conveyer having one driving device and having a pipe-like casing showing the conveyer with vertical and horizontal limbs having links as shown in Figs. 20, 21, 22 and 23 and capable of operating in a tortuous path;

Fig. 36 is a plan of a modified construction of link in which the cross bars are in bridge or arched form;

Fig. 37 is an end elevation;

Fig. 38 is a side view;

Fig. 39 is a plan of a link with sides brought to a point forwardly and rearwardly;

Fig. 40 is an end elevation;

Fig. 41 is a side elevation.

In the diagrammatic drawings similar reference letters are used for similar parts.

In Figs. 1 and 2, $f$ is the trough in which the conveyer works; the crossbar $a$ and sides $b$ are at right angles to one another and are hinged at $c$ $c$.

In Figs. 3 and 4, the sides are brought together to points $c'$ $c'$ the links being provided with means by which they can be hinged together at these points.

In Figs. 5 and $5^a$, the crossbar $a$ is provided with projections $d$ $d$ which are inclined.

In Figs. 6 and 7 the links formed of crossbars $a$ and sides $b$ $b$ are used to make a chain shown at A.

In Figs. 8, 9 and 10, connecting bars $e$ connect the sides $b$ $b$ of a lower chain to corresponding sides in an upper chain, the sides are slotted as at $b'$ to permit the links travelling around sprocket wheels or guides.

In Figs. 11, 12, 13, the sides $b$ are brought together at hinge points $c'$.

In Figs. 14 and 15, the crossbar is open fore and aft and is marked $a'$, $a'$.

In Figs. 16 and 17, the crossbar is open upwards and downwards and is marked $a^2$, $a^2$. The sides $b$ are brought to a point $c'$, $c'$.

In Figs. 18 and 19, all the links forming the chain are identical, but alternate links are turned through 90°.

In Figs. 20 and 21, the crossbars are open into circular formation $a^3$ and the sides $b$ bent into circular formation to points $c'$.

In Figs. 22 and 23, all the links forming the chain are identical, but alternate links are turned through 90°.

In Figs. 24 and 25, the trough $f$ is rectangular in form, the sprockets $g$ and $h$ being used either as a driving or trailing sprockets. Giude wheels $j$ $j$ are disposed where required, $k$ is an inlet and $m$ an outlet, the links being as shown in Figs. 1 and 2 or 6 and 7.

In Fig. 26, the conveyer is shown in a circuit, the driving gear $g$ being disposed beneath the conveyer in any suitable position, the chain A being adapted to travel in either direction, the links being as shown in Figs. 3 and 4.

In Figs. 27 and 28, the chain is shown as a multiple chain, the driving sprocket $g$ being disposed at the end of the trough or casing $f$, the links being as shown in Figs. 1 and 2 or 6 and 7.

In Figs. 29 and 30, the driving sprockets are shown as $g$ $g'$ and the trailing sprockets $h$ $h'$. Two chains A and A are disposed at a distance apart about equal to the width of the chain, the links being as shown in Figs. 1 and 2 or 6 and 7.

In Fig. 31, the chain A is formed of links shown in Figs. 8, 9 and 10, the conveyer can work in any plane and permits a certain amount of deviation from the plane in which it is disposed.

In Figs. 32 and 33, the chain A is formed of links as shown in Figs. 16, 17, 18 and 19, and can work in any plane and permits a certain amount of deviation from the plane in which it is disposed. The trough $f$ is square or rectangular in cross-section.

In Figs. 34 and 35, the chain A is formed of links shown in Figs. 20, 21, 22 and 23 and works in a tubular casing which can be flexible and moved in any direction.

In Figs. 36, 37 and 38 the crossbars $a$ are arched or of bridge formation.

In Figs. 39, 40, 41 the crossbars $a$ are arched and the sides $b$ are brought to a point $c$.

With a conveyer made in accordance with this invention, the material is transported en masse, that is, as a whole and great efficiency is attained and should a choke occur, the chain will pull through the material and thus reduce the risk of breaking the chain and further in the circuit conveyer, should the outlet be blocked, the material will be carried round and round until the outlet is free, automatically controlling the inlet. It will also be noted that the casing when used as an elevator is closed.

The dominant idea or feature of the invention is that the chain has its constituent elements assembled and proportioned so that it (in conjunction with the casing wherein it works) conveys the material en masse in any direction in any circuit in any plane, whether horizontal, vertical, inclined, or any combination of these planes. In short, it may be said that the chain forms a kind of temporary reinforcement to the mass of material in the casing functioning to coalesce and transport it in bulk mass, that is to say the material coalesces in the opening of the links, whereby the links and a part of the material composing the load jointly form or act as a continuous band supported by the bottom of the casing.

The remainder of the load is carried by this improvised band which can be of considerable depth.

What I claim and desire to secure by Letters Patent is:—

1. A conveyer for transporting material en masse in any predetermined circuit, comprising a casing adapted for the entry and discharge of the material, and endless chain-like structures traversably associated with the casing and assembled to constitute a superimposed series, with the constituent chain-like structures spaced apart at a distance approximately equal to the width of the bottom structure.

2. A conveyer for transporting material en masse in any desired circuit, comprising a casing, an inlet to said casing for the material, an outlet to said casing for the material, an endless chain-like structure in said casing, means for traversing said structure relative to said casing, lateral and transverse elements disposed in various planes and constituting said structure, said chain-like structure sweeping at least two sides of the casing and only filling part of the cross-section of the casing.

3. A conveyer for transporting material en masse in any desired circuit, comprising a casing, an inlet to said casing for the material, an outlet to said casing for the material, an endless chain-like structure in said casing, means for traversing said structure relative to said casing, lateral and transverse elements disposed in various planes and constituting said structure, said chain-like structure sweeping at least two sides of the casing and only filling part of the cross-section of the casing, said lateral and transverse elements forming a skeleton framework supporting the material to be conveyed.

4. A conveyer for transporting material en masse in any desired circuit, comprising a casing, an inlet to said casing for the material, an outlet to said casing for the material, an endless chain-like structure in said casing, means for traversing said structure relative to said casing, lateral and transverse elements disposed in various planes and constituting said structure, said chain-like structure sweeping at least two sides of the casing and only filling part of the cross-section of the casing, said lateral and transverse elements forming a skeleton framework supporting the material to be conveyed, said framework combining intimately with and conveying said material without turbulence or bruising of said material on the full feed when exceeding the angle of repose.

5. A conveyer for transporting material en masse in any desired circuit, comprising a casing, an inlet to said casing for the material, an outlet to said casing for the material, an endless chain-like structure in said casing, means for traversing said structure relative to said casing, lateral and transverse elements disposed in various planes and constituting said structure, said chain-like structure sweeping at least two sides of the casing and only filling part of the cross-section of the casing, said lateral and transverse elements forming a skeleton framework supporting the material to be conveyed, said framework supporting the sides of the stream of material to be conveyed.

6. A conveyer for transporting material en masse in any desired circuit, comprising a casing, an inlet to said casing for the material, an outlet to said casing for the material, an endless chain-like structure in said casing, means for traversing said structure relative to said casing, lateral and transverse elements disposed in various planes and constituting said structure, said chain-like structure sweeping at least two sides of the casing and only filling part of the cross-section of the casing, said lateral and transverse elements forming a skeleton framework supporting the material to be conveyed, said framework supporting the top of the stream of material to be conveyed.

7. A conveyer for transporting material en masse in any desired circuit, comprising a casing, an inlet to said casing for the material, an outlet to said casing for the material, an endless chain-like structure in said casing, means for traversing said structure relative to said casing, lateral and transverse elements disposed in various planes and constituting said structure, said chain-like structure sweeping at least two sides of the casing and only filling part of the cross-section of the casing, said lateral and transverse elements forming a skeleton framework supporting the material to be conveyed, said framework supporting the sides and top of the stream of material to be conveyed.

8. A conveyer for transporting material en masse in any desired circuit, comprising a casing, an inlet to said casing for the material, an outlet to said casing for the material, an endless chain-like structure in said casing, means for traversing said structure relative to said casing, lateral and transverse elements disposed in various planes and constituting said structure, said chain-like structure sweeping at least two sides of the casing and only filling part of the cross-section of the casing, said chain-like structure having runs travelling in separate portions of said casing, the operative run travelling in said casing in definite spaced relationship with another run.

9. A conveyer for transporting material en masse in any desired circuit, comprising a casing, an inlet to said casing for the material, an outlet to said casing for the material, an endless chain-like structure in said casing, means for traversing said structure relative to said casing, lateral and transverse elements disposed in various planes and constituting said structure, said chain-like structure sweeping at least two sides of the casing and only filling part of the cross-section of the casing, said lateral and transverse elements forming a skeleton framework supporting the material to be conveyed, said chain-like structure having runs travelling in definite spaced relationship with each other, the operative run travelling in said casing.

10. A conveyer for transporting material en masse in any desired circuit, comprising a casing of flexible structure, an inlet to said casing for the material, an outlet to said casing for the material, an endless chain-like structure in said casing, means for traversing said structure relative to said casing, lateral and transverse elements disposed in various planes and constituting said structure, said chain-like structure sweeping at least two sides of the casing and only filling part of the cross-section of the casing.

11. A conveyer for transporting material en masse in any predetermined circuit, comprising a casing adapted for the entry and discharge of the material, and endless chain-like structures traversably associated with the casing and assembled to constitute a superimposed series, with the constituent chain-like structures spaced apart at a distance approximately equal to the width of the bottom structure.

12. A conveyer for transporting material en masse in any desired circuit, comprising a casing, an inlet to said casing for the material, an outlet to said casing for the material, said outlet being established by means positioned so that the material will flow freely into the casing as the material is discharged at the outlet, an endless chain-like structure in said casing, means for traversing said structure relative to said casing, lateral and transverse elements disposed in various planes and constituting said structure, said chain-like structure sweeping at least two sides of the casing and only filling part of the cross-section of the casing.

13. A conveyer for transporting material en masse in any desired circuit, comprising a casing, an inlet to said casing for the material, an outlet to said casing for the material, the said outlet being established by means positioned so that the material can discharge gravitationally, an endless chain-like structure in said casing, means for traversing said structure relative to said casing, lateral and transverse elements disposed in various planes and constituting said structure, said chain-like structure sweeping at least two sides of the casing and only filling part of the cross-section of the casing.

14. A conveyer for transporting material en masse in any desired circuit, comprising a casing, an inlet to said casing for the material, an outlet to said casing for the material, an endless chain-like structure in said casing, said chain-like structure comprising side members and cross bars presenting operative surfaces in different planes, means for traversing said structure relative to said casing, lateral and transverse elements disposed in various planes and constituting said structure, said chain-like structure sweeping at least two sides of the casing and only filling part of the cross-section of the casing, said lateral and transverse elements forming a skeleton framework supporting the material to be conveyed.

15. A conveyer for transporting material en masse in any desired circuit, comprising a casing, an inlet to said casing for the material, an outlet to said casing for the material, an endless chain-like structure in said casing, said chain-like structure comprising side members and cross bars forming operative surfaces in the same plane, means for traversing said structure relative to said casing, lateral and transverse elements disposed in various planes and constituting said structure, said chain-like structure sweeping at least two sides of the casing and only filling part of the cross-section of the casing, said lateral and transverse elements forming a skeleton framework supporting the material to be conveyed.

16. A conveyer for transporting material en masse in any desired circuit, comprising a casing, an inlet to said casing for the material, an outlet to said casing for the material, an endless chain-like structure in said casing, said chain-like structure comprising side members and cross bars having bridge-like structures associated therewith, means for traversing said structure relative to said casing, lateral and transverse elements disposed in various planes and constituting said structure, said chain-like structure sweeping at least two sides of the casing and only filling part of the cross-section of the casing, said lateral and transverse elements forming a skeleton framework supporting the material to be conveyed.

In testimony whereof, I affix my signature.

ARNOLD REDLER.